United States Patent [19]
Gosselin et al.

[11] Patent Number: 5,983,509
[45] Date of Patent: Nov. 16, 1999

[54] MARINE NAVIGATION DEVICE

[76] Inventors: Francis Gosselin, 11, rue Edouard Larue; Frédéric Leloup, Le Havre Plaisance Bd. Clémenceau, both of 76600 Le Havre, France

[21] Appl. No.: 08/981,703

[22] PCT Filed: Jul. 2, 1996

[86] PCT No.: PCT/FR96/01016

§ 371 Date: Jan. 5, 1998

§ 102(e) Date: Jan. 5, 1998

[87] PCT Pub. No.: WO97/02468

PCT Pub. Date: Jan. 23, 1997

[30] Foreign Application Priority Data

| Jul. 5, 1995 | [FR] | France | 95 08120 |
| Jun. 20, 1996 | [FR] | France | 96 07673 |

[51] Int. Cl.⁶ .................. B43L 5/00; B43L 7/10; A47B 27/00
[52] U.S. Cl. ............... 33/1 SD; 33/424; 33/431; 33/457; 33/471
[58] Field of Search ................ 33/1 SD, 464, 33/452, 471, 431, 457, 424, 425, 426

[56] References Cited

U.S. PATENT DOCUMENTS

| 982,793 | 1/1911 | Burrage | 33/424 |
| 1,630,414 | 5/1927 | Baier | 33/424 |
| 2,465,481 | 3/1949 | Reiche | 33/424 |
| 2,717,448 | 9/1955 | Lubin et al. | 33/424 |
| 2,914,853 | 12/1959 | Michell | 33/424 |
| 3,373,493 | 3/1968 | McDonald | 33/1 SD |
| 3,497,678 | 2/1970 | Warner | 33/424 |
| 3,690,009 | 9/1972 | Henley, III | 33/424 |
| 3,855,706 | 12/1974 | Price | 33/1 SD |
| 4,208,805 | 6/1980 | McEwen | 33/431 |
| 4,637,143 | 1/1987 | Telles | 33/457 |
| 5,167,076 | 12/1992 | Sump | 33/431 |
| 5,241,754 | 9/1993 | Hogan | 33/457 |
| 5,404,648 | 4/1995 | Taylor, Jr. | 33/431 |
| 5,461,794 | 10/1995 | Huang | 33/470 |

FOREIGN PATENT DOCUMENTS

| 1253838 | 2/1986 | U.S.S.R. | 33/424 |

*Primary Examiner*—Randy W. Gibson
*Attorney, Agent, or Firm*—Horst M. Kasper

[57] ABSTRACT

Device for positioning and orienting a boat on a navigational chart by data supplied by a communication via satellite (Global Positioning system), more commonly designated G.P.S., comprising two superposed disks, one serving as lower protractor (D1) provided with a North mark, the other as upper reader (D2), connected in their rotation center by an eyelet (24), two positioning rulers (R1, R2) punched by a longitudinal central aperture (4,5) and present on their edges a tenon which allows them to slide freely, each one in a mortised slide provided on each disk. During the positioning on the chart, the two disks are blocked (D1, D2) one against the other, the lower disk (D1) such as its North mark are placed in direction of the chart, the two rulers (R1, R2) are blocked perpendicularly one towards the other but with free slide. The disks are unlocked (D1, D2) during the orientation, and the upper disk (D2) can pivot with the upper niler (R2) which is used as orientation ruler. For locking, the upper disk (D2) carries an immobilization device, such as a thread case (20) and a blocking screw (21), that cooperate with the hole (16) on the lower disk (D1)

8 Claims, 6 Drawing Sheets

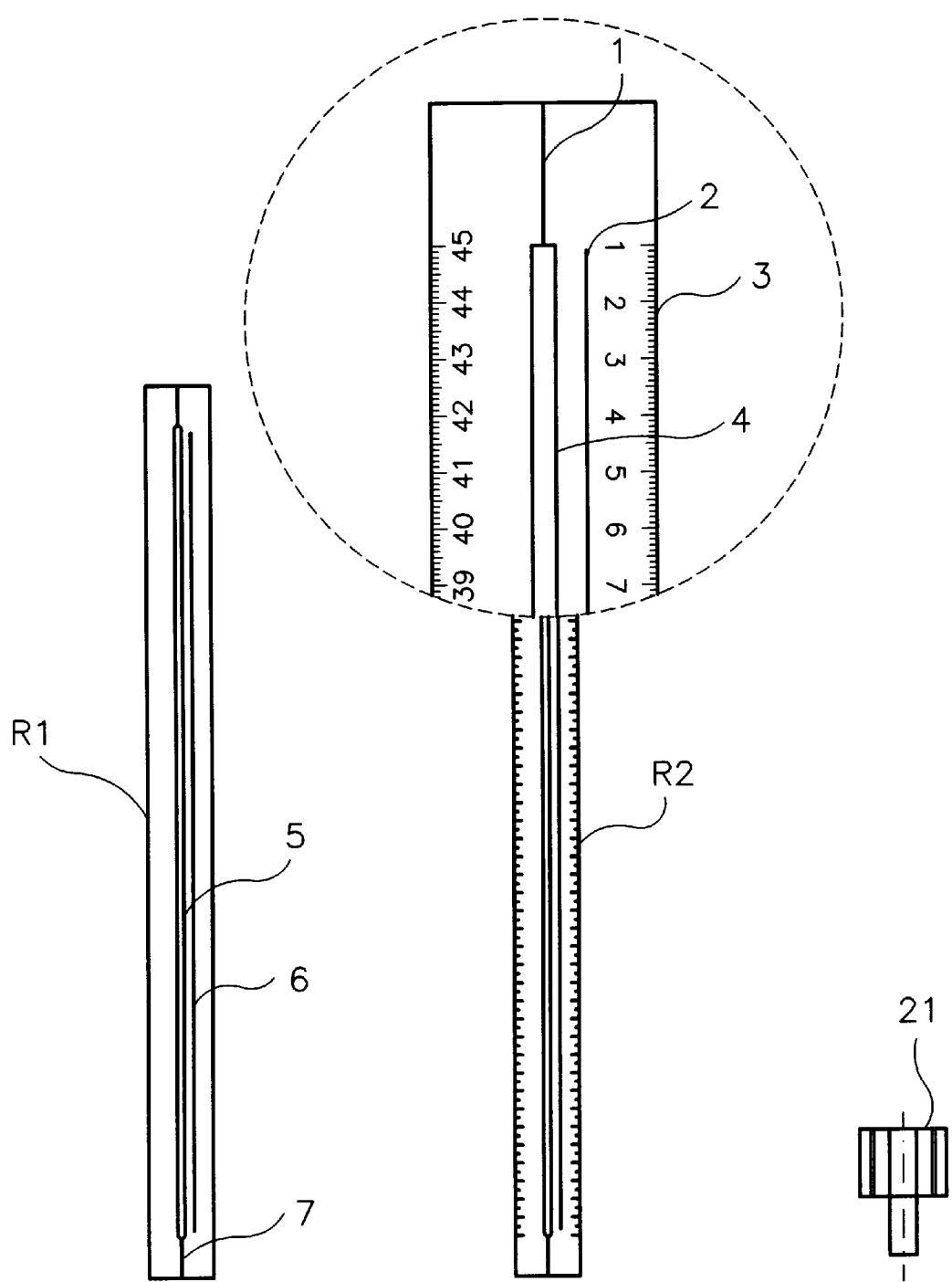

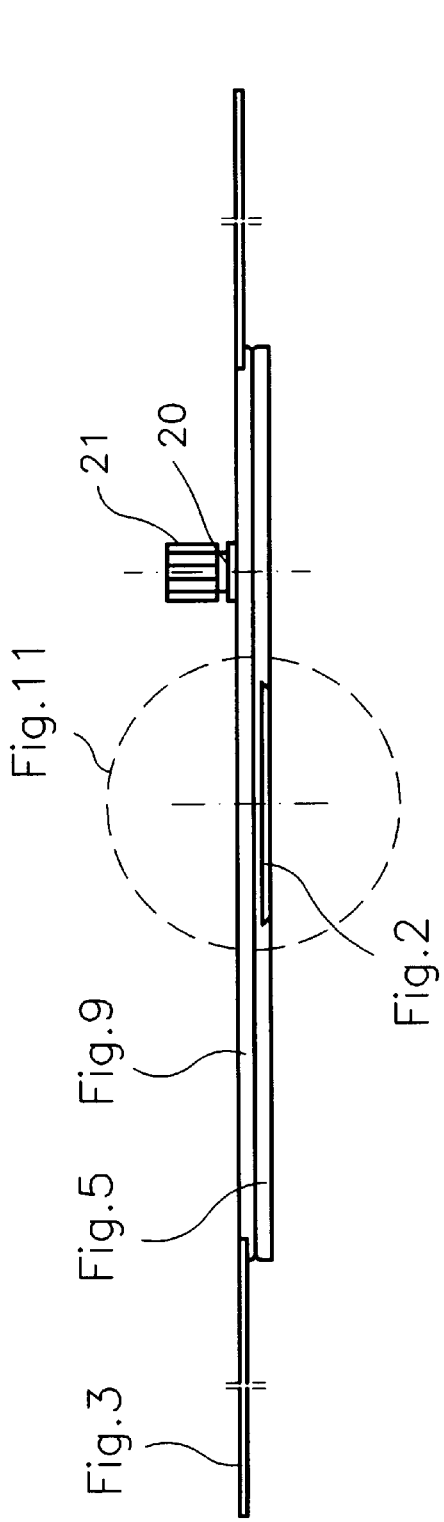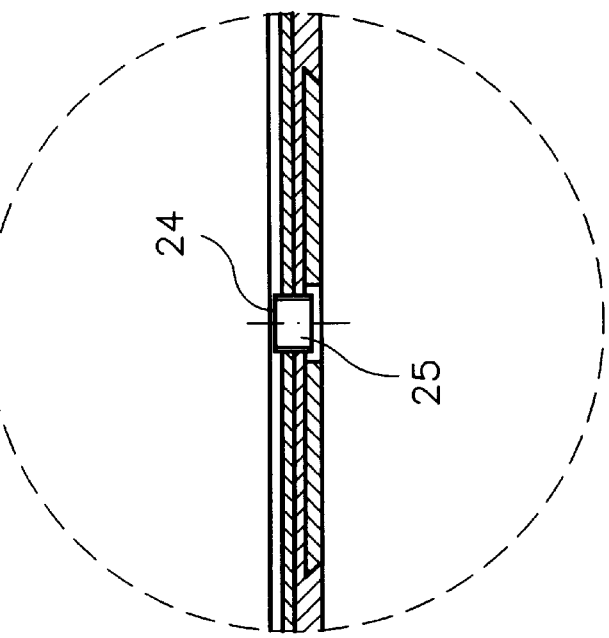

MARINE NAVIGATION DEVICE

Marine navigation device by means of data supplied by a G.P.S. that allows one to position on a chart, to orient and to trace easily one's route.

The invention refers to a marine navigation device by means of data supplied by a G.P.S. which allows the positioning on a chart, the orientation and the tracement of one's route with the greatest of ease.

Numerous means have been used in maritime navigation to locate and trace one's route, these means concerned essentially the sextant, the compass rose and the compass.

The development of communications via satellites allows nowadays the transmission of the data in real time and the expansion of the "Global positioning system ", more commonly designated G.P.S., enabling to supply exact indications of latitude and longitude in relation to an exact point of emission in aerial, maritime or land navigation.

In maritime navigation it is interesting to use the data of the G.P.S. and to finalize a simple and effective device which allows one to transpose rapidly the indications of the latitude and longitude supplied by the G.P.S. on a chart.

Certain known means have attempted to use the data of the G.P.S., but to date the used devices have not allowed the rapid and exact positioning on a navigational chart. On the contrary, it seems that the known means lead the navigator to use meridians and parallels in an approximate way.

Furthermore, some of these means do not consider the surface of the chart tables, namely of those used by pleasure boats which allow the installation of positioning means and simple and effective reading means.

PRIOR ART & STATE OF THE ART

Apart from the traditional means described above, the patent DE.U.9213 021 (SCHUZ & AL) describes a navigation ruler made in two parts. This ruler can only pivot but does not allow any sliding motion, which presents many drawbacks tied to utilisation and precision. This means allows to transpose the data of the G.P.S. but the ruler must be displaced as a whole on the navigational chart, which is disposed on the table provided FOR that purpose. The displacement on the chart is not always easy, but above all this one involves a loss of precision.

Another document GB A.229 815 (COWWAN THOMAS ALEXANDER) also concerns a reading means from data supplied by a G. P. S.

Although it is interesting, this means allows a reading according to the bearing and of the distance and requires a programmation of the G.P.S. on the centre of the compass rose to be used, which is not suitable for pleasure navigation where reading must be quick, simple and safe.

Other documents such as the U.S. Pat. No. 4 969 271 (SUMA Mallory L) refer to means based on the << universal and transverse Mercator's projection of the earth>> but these means often describe specific applications, such as military, and do not refer in any way to pleasure navigation. This document describes a device in order to position on a chart including two superimposed discs, one serving as protractor, the other as reader. These discs are connected in their rotation centre by bearing means. It also includes two positioning and orientation rulers 16,18. This device allows, however, the location of the user by two other known points which can visually be identified on the ground, by the location of the user. This device is intended to be used on land and not on sea.

Despite these interesting inventive steps, the known means do not allow to transpose with rapidity and precision the data supplied by a G.P.S.

It became necessary to remedy the drawbacks of the known means and to obtain an effective, simple and safe navigation ruler.

This invention proposes to reach these objectives and refers to a device of simple conception and utilisation, allowing very rapidly the positioning and the tracing of one's route with the greatest of ease.

DESCRIPTION OF THE INVENTION

The device is composed of two revolving discs one on top of the other and of two sliding rulers for positioning and for fast reading, the whole maintained by a central bearing eyelet. Each disc is provided with a slide guiding the transposition of the adjacent ruler by means of a central longitudinal aperture. An immobilisation means, such as a screw or other, situated on the upper disc allows the locking of the two discs in the positioning function and the unlocking during the orientation function.

In order to position oneself on a chart, it is sufficient to place first the two rulers perpendicularly one to the other, to block them in this position by suitable means, then to position either the lower ruler along a meridian, or the upper ruler along a parallel and then to bring the rulers, one after the other, on the latitude and longitude scale in function of the data supplied by the G.P.S. The central eyelet, situated at the intersection of the two rulers, allows the user to easily mark his point. It is then sufficient to unlock the clamping means in order to allow the upper disc to pivot around the central eyelet in order to orient by means of the protractor and to trace one's route with help of the upper ruler.

The invention is represented as an example in the annexed drawings, in which:

FIG. 2 represents the lower ruler.

FIG. 3 represents the upper ruler.

FIG. 8 represents a blocking means.

FIG. 10 represents a sectional view of the device according to the invention.

FIG. 11 represents a sectional view of the central eyelet of the device.

Figure 1:
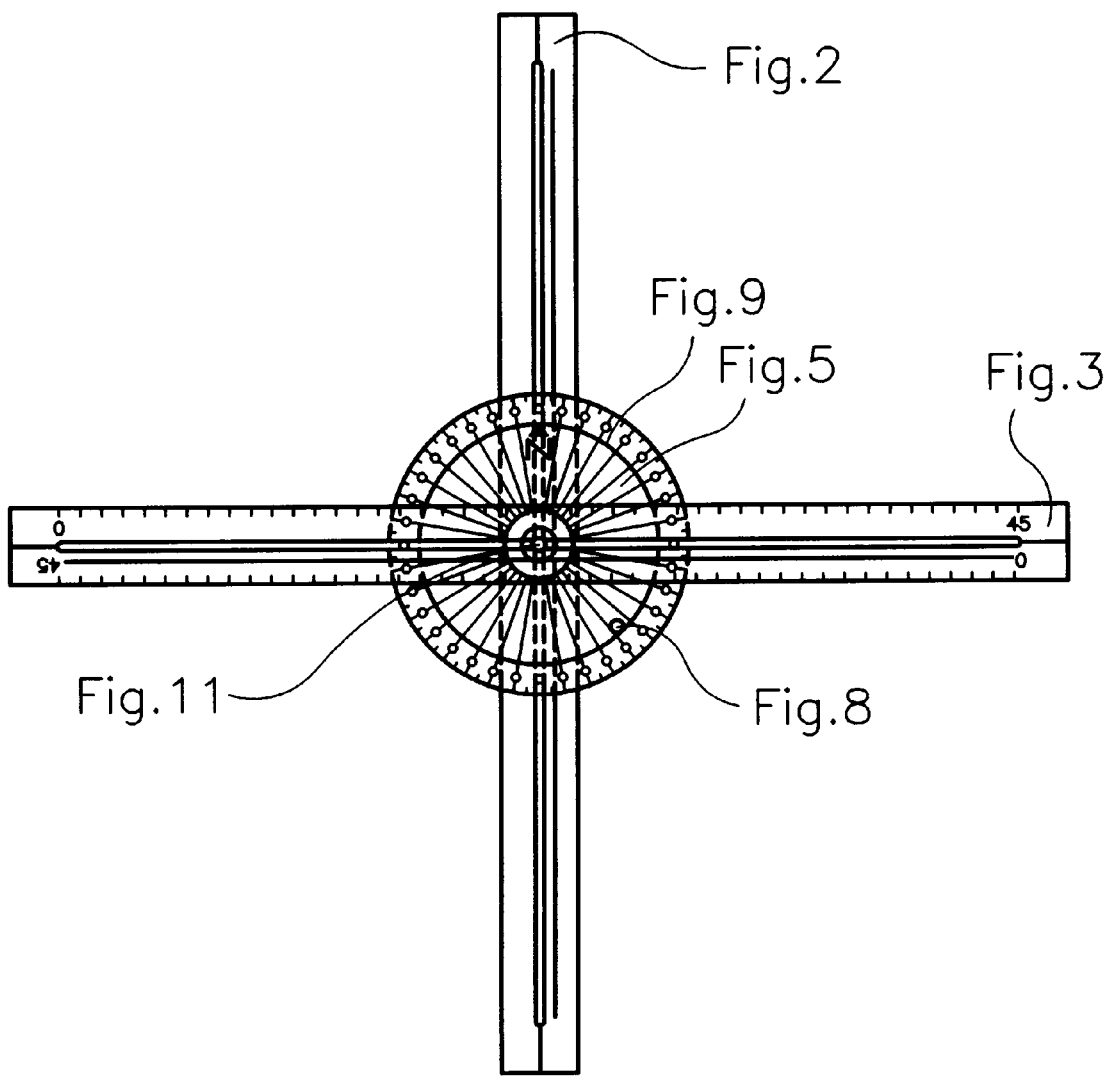
FIG. 1 represents the navigation device according to the invention.
Figure 4:
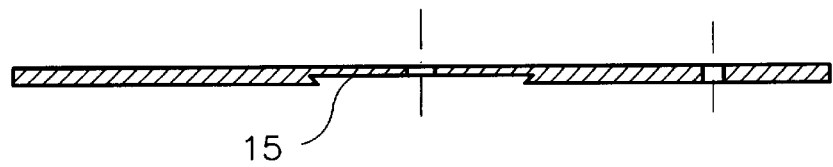
FIG. 4 represents a sectional view of the protractor of the device.
Figure 5:
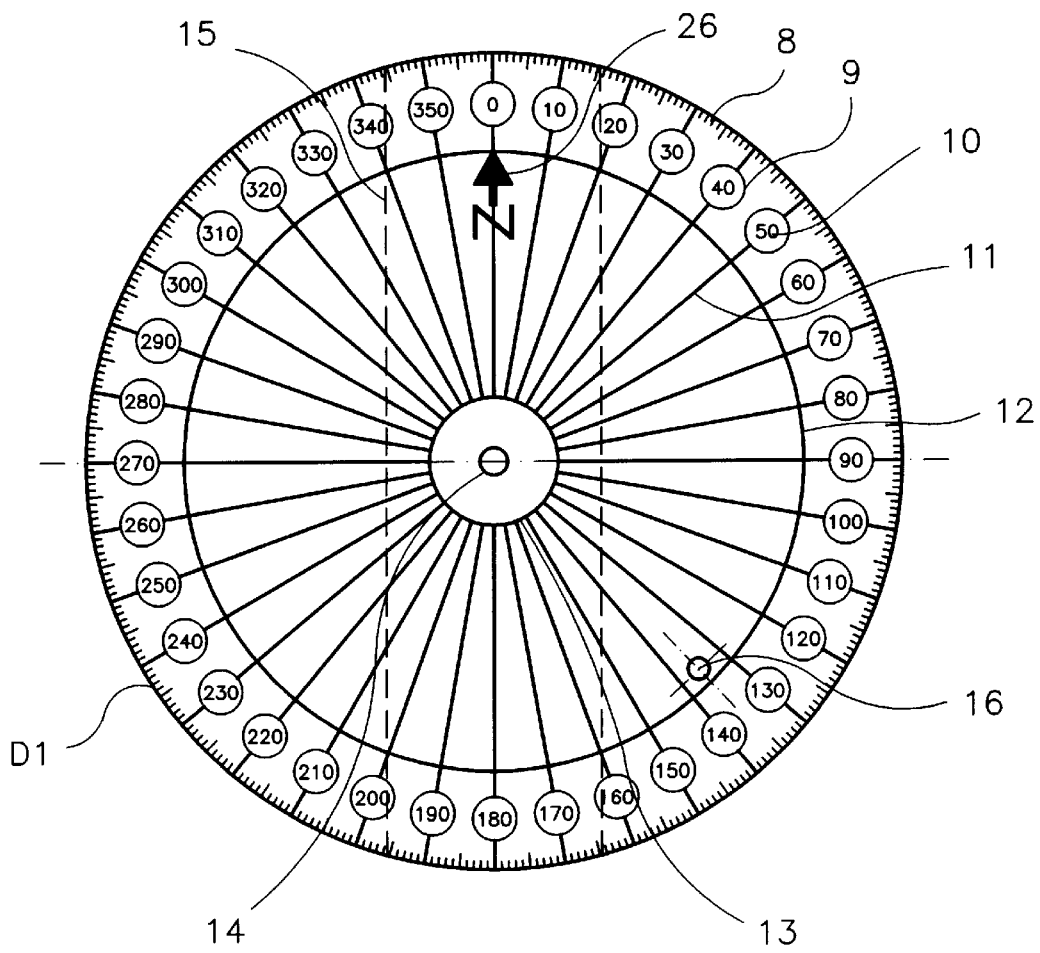
FIG. 5 represents the protractor.
Figure 6:
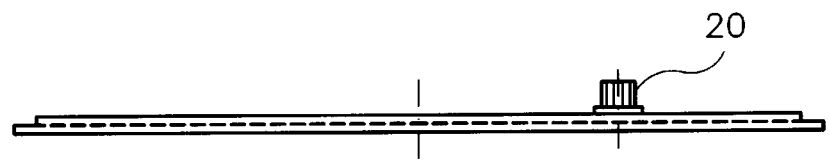
FIG. 6 represents a profile view of the upper disc.
Figure 7:
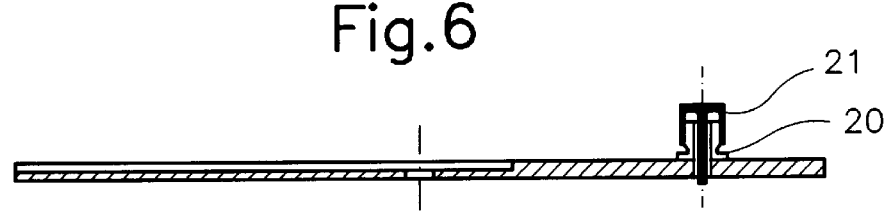
FIG. 7 represents a sectional view of the upper disc and a blocking means.

According to a first characteristic, the device, that allows a positioning on a navigational chart by data supplied by a G.P.S., includes a positioning ruler and a fast reading ruler, conceived to present two superposed discs, the first one serving as protractor, and the other one as reader, connected in their rotation centre by a bearing means and two positioning rulers, the upper ruler is also used for the orientation, said rulers are punched and present on their edges a tenon allowing them to slide freely, each one in a mortised slide provided on each disc, the upper ruler is provided with a double longitudinal scale. The means of reunion of the two superposed discs is an eyelet, which allows the free rotation of each disc, one around the other, and serves as a bearing means.

Each disc is provided with a mortised groove, the groove of the upper disc is disposed diametrically on its upper part while the mortised groove of the lower disc is disposed diametrically on its lower part.

The lower disc is a protractor graded from 0 to 360°, the degrees are for an horizontal reading, a North mark "N" is disposed in a sign-posted way under. the zero "0" of said protractor.

The upper disc is used as reader and is traversed diametrically by a sign-posted mark towards its external edges.

The dimension of the lower disc corresponds to that of the protractor D2. The latter is graded from 0° to 360°, the numbers 10 are placed in the circles 9, all the numbers 10 are printed in order to allow the navigator a reading on the right side during use of the device. The numbers 10 from 0° to 180° are traced in black, the one from 190° to 360° are traced in red. An "N" 26 traversed by an arrow is disposed on the protractor, it allows the user of the device to orient the North of the protractor towards the North of the chart. A circular line 12 is also printed as well as a central circle 13 from which depart lines 11 every ten degrees in order to connect all the numbers 10. The protractor disposes of a centre hole 14 through which passes the eyelet 24 and of a second hole through which bores the bearing means 21. The protractor also includes in its South-North axis, a slide 15, the depth and width of which respectively are equivalent to the thickness and the width of the lower ruler FIG. 2, which can fit in the protractor and which slides easily in the slide 15.

Figure 9:
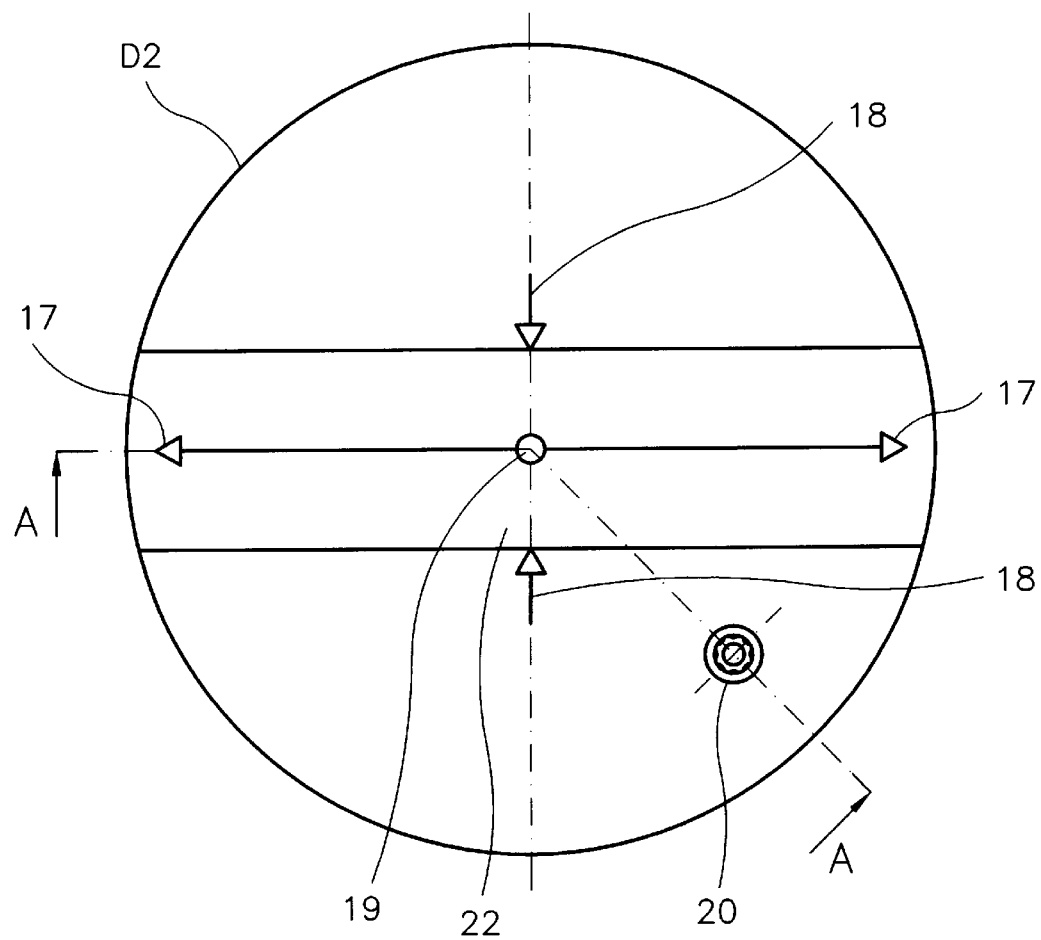
FIG. 9 represents the upper disc.
Figure 12:
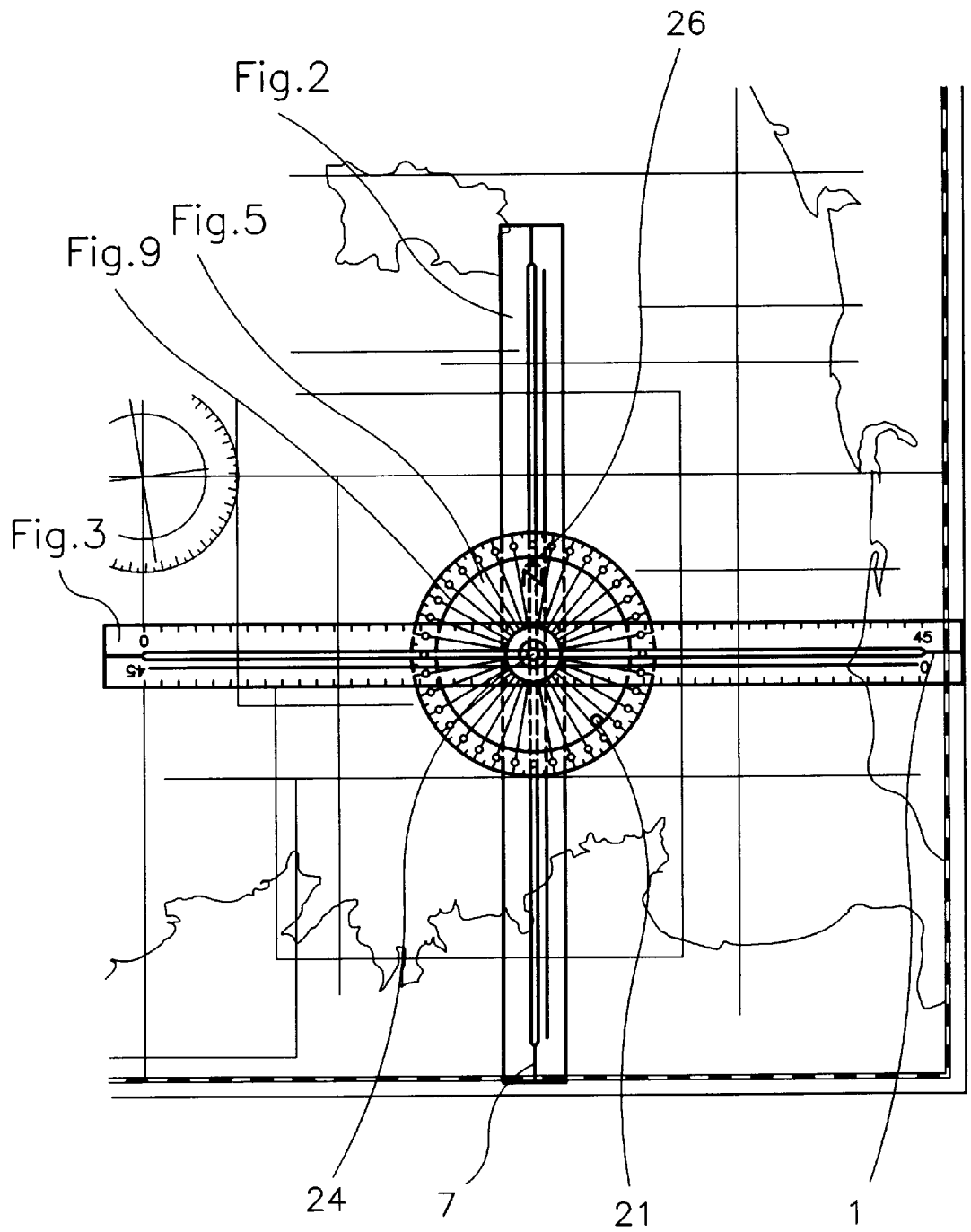
FIG. 12 represents the device during the utilisation.

The device includes a second upper disc (FIG. 9) identical in size to the first one, placed on the protractor. This disc also includes a slide 22 that is used as a guide in which the graded upper ruler fits in order to slide.

The eyelet 24 leads to the centre hole 19 of the disc and serves as rotation axis. On each side of the centre hole 19, a line 17 prolonged by an arrow in the middle of the slide 22 is disposed. The arrow 17 is the prolongation of the line of "sight" 1, it allows the navigator to orient by using the degrees 8 of the protractor. The upper disc also includes two arrows 18 in both parts of the slide 22 and allows one to use the degrees 3 situated on the upper ruler.

The two rulers are made to present a tenon destined to engage in the mortise of each disc on their edges, so that they form a slide and slide freely, the central part of each ruler is provided with a longitudinal aperture in which the central bearing eyelet slides, the rulers are used for the positioning, the upper ruler is used for the orientation.

The upper ruler is graded longitudinally on each of its edges and these scales are graded from 0to 45.

The lower ruler (FIG. 2) is punched by a longitudinal central aperture of the same width as the central eyelet 24 and prolonged by a line of "sight" 7. The ruler also disposes of a longitudinal line 6 of the same length as the aperture 5 and positioned at equal distance between the aperture 5 and the edge of the ruler. The width of the ruler corresponds to the width of the slide 15 of the protractor where the ruler fits. The eyelet 24 is placed in the aperture 5, the ruler can thus slide in the slide 15 of the protractor.

The device also includes a second ruler (FIG. 3) the concept of which is practically identical to the previous one, namely a longitudinal central aperture prolonged by a line of "sight" 1 and a longitudinal line 2. It is graded 3 in centimetres on each edge and of identical length as the aperture 4. The degrees 3 are graded from 0 to 45 centimetres and are inverted one into the other. The width of the ruler corresponds to that of the slide 22 of the upper disc where the ruler fits. Regarding the eyelet 24, it is in the aperture 4 and allows thus the ruler to slide in the slide 22 of the upper disc.

Each disc includes on its circumference an immobilisation means. This means can be constituted of a thread case 20 fixed on the disc, it receives a blocking screw 21. Thus, after placing the blocking screw 21 above the hole 16 of the protractor, it is sufficient to screw it lightly so that it penetrates in the hole 16 and allows thus the blocking of the two discs.

The two rulers are then perpendicular one in relation to the other. Conversely, unscrewing the screw 21, the device is unlocked in order to allow the upper disc to pivot on the protractor around the axis formed by the eyelet 24, and to allow thus the upper ruler to pivot according to a comprised angle between 0° and 360°.

The two discs of the device are maintained by the central eyelet 24, the latter interlock the centre hole 14 of the protractor and the hole 19 of the upper disc. The apertures 4,5 of each of the rulers allow the free transposition of these in both parts of the central eyelet 24. Finally, by passing the point of a pencil through the hole 25 of the eyelet 24, the navigator has the possibility to point its position on the chart.

The blocking means can still be constituted of peripheral gear teeth provided on the upper disc, fitting in a peripheral notch provided on the lower disc.

In order to better illustrate the invention, an example of the application of positioning on a chart by data supplied by the G.P.S. is given, the navigator processes in the following way:

The blocking means 21 is lightly screwed so that it penetrates 20 in the hole 16 of the protractor and that it blocks the two rulers in perpendicular position. The navigator superposes or the line 6 of the lower ruler on a meridian, or the line 2 of the upper ruler on a parallel without omitting to adjust the North 26 of the protractor with that of the chart. The only thing left, is to slide the rulers one after the other in their slides 15, 22 so as to place the lines of "sight" 11, 7 of the rulers at the level of the latitude and longitude indicated by the G.P.S.; the hole 25 formed by the eyelet 24 and situated on the centre of the device, represents the position of the boat on the chart and allows its location.

It is sufficient then to unscrew lightly the blocking means 21 in order to permit the upper disc to pivot around the eyelet 24 and to allow thus the orientation of the upper ruler towards an aim using the line of "sight" 1. The arrow 17 of the upper disc is on the axis of the line of "sight" 1. It allows thus the navigator to orient using the degrees 8 situated on the protractor.

Furthermore, the upper ruler which disposes of a double scale 3 allows one to determine the distance between two points. In fact, by placing first the centre of the eyelet 24 on one of the two points and by bringing the end of the aperture 4 of the upper ruler on the level of the other point, one can read the degrees 3 indicated by the arrow 18 in order to know the distance in centimetres between two points. Transferring this distance on the latitude scale, it is then possible to know the distance in marine miles.

The particularity of the device also allows one to determine rapidly the coordinates of any point situated on the chart. In fact, after blocking the two rulers in perpendicular position and placing the centre of the eyelet 24 on the point in question, providing that the North 26 of the protractor corresponds with that of the chart, it allows one to read the latitude and the longitude indicated by two lines of "sight" 1, 7.

The device according to the invention, is particularly intended to facilitate the work on navigational charts

We claim:

1. Device for positioning and orienting a boat on a navigational chart by data supplied by a communication via satellite, more commonly designated G.P.S., comprising two superposed disks, one serving as lower protractor (D1) provided with a North mark, the other as upper reader (D2), connected in their rotation center by a bearing means (24), two positioning rulers (R1, R2), said rulers are punched by a longitudinal central aperture (4,5) and present on their edges a tenon which allows them to slide freely, each one in a mortised slide provided on each disk, characterized in that during the positioning on the chart, the two disks are locked (D1, D2) one against the other, the lower disk (D1) such as its North mark are placed in direction of the chart, the two rulers (R1, R2) are locked perpendicularly one towards the other but with free slide, and the disks are unlocked (D1, D2) during the orientation, the upper disk (D2) can pivot with the upper ruler (R2) which is used as orientation ruler, the upper disk (D2) carries a locking means that cooperate with a reception means on the lower disk (D1).

2. Device according to claim 1, characterized in that the hearing means of the two superposed disks is an eyelet (24), in that this eyelet (24) allows the free rotation of each disk one around the other, and in that said eyelet is used as said bearing means.

3. Device according to claim 1, characterized in that the lower disk (D1) is a protractor graded from 0 to 360°, in that the degrees 10 are for horizontal reading and in that the North mark "N" is disposed as an arrow under zero "0" of said protractor.

4. Device according to claim 1, characterized in that the upper disk (D2) used as reader, is traversed diametrically by an arrow mark (17) through its external edges.

5. Device according to claim 1, characterized in that the two rulers (R1, R2) are made to present on their edges a tenon destined to engage in said mortised slide (15, 22) of each disk in order to form a slide and to slide freely, in that the central part of each ruler is provided with a longitudinal aperture (4, 5) in which slides the bearing means (24), and in that the rulers are used for positioning, the upper ruler is used for the orientation.

6. Device according claim 1, characterized in that the upper ruler (R2) is graded longitudinally on each of its edges and the upper ruler is graded from 0 to 45.

7. Device according to claim 1, characterized in that the lower disk (D1) includes said reception means which is hole (16) near its circumference, and in that the upper disk (D2) includes said locking means near its circumference, said means constitutes a thread case (20) fixed on the disk and receives a blocking screw (21), said blocking screw (21) penetrates in the hole (16) of the lower disk (D1).

8. Device according to claim 1, characterized in that the upper disk (D2) includes near its circumference said locking means of upper gear teeth leading to a lower notch provided near the circumference of the lower disk (D1).

* * * * *